United States Patent
Hille et al.

(10) Patent No.: US 6,472,465 B1
(45) Date of Patent: Oct. 29, 2002

(54) COATING COMPOSITION

(75) Inventors: Hans-Dieter Hille, Bergisch Gladbach; Horst Müller, Köhn, both of (DE)

(73) Assignee: Bollig & Kemper, Köln (DE)

( * ) Notice: Subject to any disclaimer, the term of this patent is extended or adjusted under 35 U.S.C. 154(b) by 0 days.

(21) Appl. No.: 09/453,663

(22) Filed: Dec. 3, 1999

Related U.S. Application Data

(63) Continuation of application No. PCT/DE97/03016, filed on Dec. 24, 1997.

(30) Foreign Application Priority Data

Dec. 27, 1996 (DE) .......................................... 196 54 296

(51) Int. Cl.$^7$ .............................. C08J 3/00; C08K 3/20; C08L 75/00; B05D 3/02; B32B 27/00
(52) U.S. Cl. ................. 524/591; 427/372.2; 427/385.5; 428/423.1; 524/839; 524/840
(58) Field of Search ................................. 524/591, 839, 524/840; 428/423.1; 427/372.2, 385.5

(56) References Cited

U.S. PATENT DOCUMENTS 3,639,147 A    2/1972  Benefiel et al.
4,622,360 A  * 11/1986  Gomi et al. ................. 524/507

FOREIGN PATENT DOCUMENTS

DE        32 01 224    7/1983
EP         265 363     4/1988

* cited by examiner

Primary Examiner—Patrick D. Niland
(74) Attorney, Agent, or Firm—Cohen, Pontani, Lieberman & Pavane

(57) ABSTRACT

Coating composition obtainable by mixing a) a composition A containing a dispersion of a polyurethane having an acid number of more than 20 and comprising as its soft segment at least one polytetrahydrofuran segment having a number-average molecular weight of between 650 and 5000 and as its hard segment at least one segment derived from a diisocyanate; with b) a composition B containing a dispersion of a polyurethane having an acid number of less than 20 and comprising as its soft segment at least one polytetrahydrofuran segment having a number-average molecular weight of between 800 and 5000 and as its hard segment at least one segment derived from a diisocyanate.

33 Claims, No Drawings

COATING COMPOSITION

This is a Continuation under 35 USC §111 and 37 CFR §1.53 of International Application No. PCT/DE97/03016 filed Dec. 24, 1997, Claiming Priority of German Application 196 54 296.0 filed Dec. 27, 1996.

BACKGROUND OF THE INVENTION

1. Field of the Invention

The present invention relates to a coating composition and to its use, especially for painting bodies in the automotive industry.

2. Discussion of the Prior Art

A major problem associated with the painting of car bodies is the stone-chip resistance of the overall paint system and also the UV protection of the electrophoretically applied coat (CED coat).

A conventional car paint finish in accordance with the so-called basecoat/clearcoat process with sufficient stone-chip resistance and good UV protection consists of a total of four different coats (four-coat structure). These four coats are applied in succession in separate coating units. The first coat, situated directly on the metal panel of the car, is an electrophoretically applied coat (electrocoat, CED coat) which is applied by electrodeposition coating primarily cathodic deposition coating (CED)—for the purpose of corrosion protection and is subsequently stoved.

The second coat, situated on the electrocoat and having a thickness of from about 30 to 40 µm, is a so-called surfacer coat which firstly offers protection against mechanical attack (anti-stone-chip function) and secondly evens out the rough surface of the unfinished body for the subsequent topcoat, levels minor unevennesses and protects the electrophoretically deposited coat (CED coat) against natural UV radiation. This coat is produced in the majority of cases by application of stoving enamel, using electrostatic high-speed rotary bells, for example, with a subsequent stoving operation at temperatures of more than 130° C.

The third coat, situated on the surfacer coat, is the basecoat, which by means of appropriate pigments gives the body the desired colour. The basecoat is applied in the conventional spraying process. Depending on shade, the thickness of this conventional basecoat is from about 12 to 25 µm. This coat is usually applied in two process steps: for example, in a first step by application using electrostatic high-speed rotary bells, followed by a second application by means of pneumatic atomization. This coat is subsequently subjected to intermediate drying using infrared radiators and/or by means of hot-air convection.

The fourth and topmost coat, situated on the basecoat, is the clearcoat, which is usually applied in one application by means of electrostatic high-speed rotary bells. It gives the body the desired gloss and protects the basecoat against environmental influences (UV radiation, salt water, etc). Subsequently, the basecoat and the clearcoat are stoved together.

It is a concern of the automotive industry to provide motor vehicle paint systems whose overall level of properties is comparable with that of the prior art but which exhibit a reduced thickness of the overall paint structure, which minimize the effort required to produce the overall paint system, and which can be carried out with as few stoving steps as possible.

In this context, the aim is for a paint system consisting of three different coats (three-coat structure) in which the surfacer coat of the conventional four-coat structure is omitted and the basecoat is applied directly to the electrophoretically deposited first coat. This means that the basecoat, previously accorded primarily decorative properties, is now required to take over the functional properties of the previous surfacer coat as well.

A key concern of the automotive industry in respect of this three-coat structure is to increase the thickness of the basecoat in order to protect the CED coat more effectively against UV radiation. Although the topcoat usually includes a UV absorber, this absorber serves primarily to protect the clearcoat against free-radical degradation and to protect the basecoat, especially the organic pigments of the basecoat. This UV absorber does not offer sufficient protection for the CED coat.

The problem with simply increasing the thickness of the basecoat is that there is a drastic deterioration in the boil and run resistance. By boil resistance of a coating material is meant the fact that the applied coat does not form bubbles during the stoving operation; run resistance means that the applied coat shows no sagging during the stoving operation.

The attempts to date to apply conventional basecoat directly to the CED coat resulted in drastically impaired properties of the resultant coat structure, and in particular resulted in inadequate behaviour with respect to stone chipping.

From EP-A-0 265 363 it is known to provide a stoved, cataphoretically applied primer (CED coat) with a conventional two-coat basecoat/clearcoat finish applied by the wet-on-wet process. The disadvantage is that stone-chip damage on motor vehicles painted by this process is evident to a particularly marked extent, since topcoat delamination due to stone chipping exposes large areas of the primer coat.

From DE 195 12 017 it is known to apply a conventional basecoat wet-on-wet directly to the CED coat and to stove the two coats together. Over this stoved coat, a further conventional, waterborne base-coat is applied wet-on-wet with a topcoat, and stoved. The disadvantage associated with this process is that it requires the fundamental reorganization, and rebuilding at considerable expense, of the existing coating lines of the car manufacturers.

Furthermore, there are efforts to provide a specific basecoat which exhibits both the required decorative properties and functional properties.

For instance, DE 195 29 394 discloses the use of a specific aqueous basecoat, containing free isocyanate groups, which is applied directly to the stoved CED coat. However, this basecoat has the disadvantage that it is not stable on storage and can be processed only using a two-component unit.

Furthermore, DE 195 04 947 discloses conditioning a basecoat by means of a compensation coating material in such a way as to give the desired properties. However, it is not possible to achieve a coat thickness sufficiently high for adequate UV protection.

SUMMARY AND DESCRIPTION OF THE INVENTION

The object of the present invention is to provide a coating composition which can be used for automotive OEM finishing and which when so used imparts both the decorative properties of the conventional basecoat and the functional properties of the conventional surfacer coat in the conventional four-coat structure.

Furthermore, it must be possible to apply this coating composition in a thickness such as on the one hand to ensure effective UV protection of the first CED coat without on the other hand the occurrence at such coat thicknesses of the known problems in respect of boil and run resistance, as compared with conventional basecoats of the prior art.

This object is achieved in accordance with the invention by a coating composition obtainable by mixing a) a composition A, this composition comprising a dispersion of a polyurethane having an acid number of more than 20 and comprising as its soft segment at least one polytetrahydrofuran segment having a number-average molecular weight of between 650 and 5000 and as its hard segment at least one segment derived from a diisocyanate; with b) a composition B, this composition comprising a dispersion of a polyurethane having an acid number of less than 20 and comprising as its soft segment at least one polytetrahydrofuran segment having a number-average molecular weight of between 800 and 5000 and as its hard segment at least one segment derived from a diisocyanate.

The acid number is established by adding an appropriate amount of a compound which contains at least two groups which react with isocyanate groups (isocyanate-reactive groups) and at least one group which is capable of forming anions (anion-forming group) to the polyurethane dispersion that is to be adjusted. Examples of a suitable compound which contains at least two isocyanate-reactive groups and at least one anion-forming group are dihydroxypropionic acid, dimethylolpropionic acid, dihydroxysuccinic acid or dihydroxybenzoic acid. Examples of amino-containing compounds are α,δ-diaminovaleric acid, 3,4-diaminobenzoic acid, 2,4-diaminotoluene-5-sulphonic acid and 4,4'-diaminodiphenyl ether sulphonic acid.

The compound which contains at least two isocyanate-reactive groups and at least one anion-forming group can be neutralized with a tertiary amine before being added. Examples of suitable tertiary amines for neutralizing the anionic groups are trimethylamine, triethylamine, dimethylaniline, diethylaniline and triphenylamine, especially N,N-dimethylethanolamine.

Depending on the desired shade, the coating composition of the invention additionally comprises a colouring pigment and/or an effect pigment. Suitable colouring pigments are, in particular, absorption pigments and/or fillers, such as titanium dioxide, iron oxide pigments, carbon black, silicon dioxide, azo pigments, phthalocyanine pigments, quinacridone pigments, diketopyrrolopyrrole pigments, perylene pigments, indanthrone pigments, talc, mica, kaolin, chalk, barium sulphate, various silicas, silicates and organic fibres, for example.

Examples of effect pigments are the platelet-shaped pigments commonly used in effect coating materials, such as metal pigments, of titanium, aluminium or copper, for example; interference pigments, such as metal oxide-coated metal pigments, examples being titanium dioxicle-coated or mixed oxide-coated aluminium, coated mica, for example titanium dioxide-coated or mixed oxide-coated mica, microtitanium dioxide and graphite effect pigments, platelet-shaped iron oxide (micaceous iron oxide), molybdenum sulphide pigments, platelet-shaped copper phthalocyanine pigments and bismuth oxychloride platelets, and coated glass flakes.

The use of colouring pigments and effect pigments is dependent, however, on the respective shade. If, for example, the article to be coated is to receive a straight shade (i.e. a shade without metallic effect), then the coating composition contains only a colouring pigment.

If, on the other hand, the article to be coated is to receive a silver shade, then the coating composition contains only the corresponding effect pigment, aluminium bronze. If, alternatively, the article to be coated is to receive a blue metallic shade, then the coating composition contains both a colouring pigment and an effect pigment.

Where the coating composition does include a colouring pigment, this pigment is introduced into the composition A before the two compositions A and B are mixed. It is particularly advantageous if the colouring pigment is ground with the composition A until the colouring pigment has the desired particle size.

Where the coating composition does include an effect pigment, this pigment is introduced into the composition B before the two compositions A and B are mixed. For this purpose the effect pigment can be ground in the composition B, for example, by first of all adding preferably water-dilutable organic solvents and additives to the commercial effect pigment, which is usually present as a powder or in paste form, and then processing these components to form a paste. In this case it must be ensured that the effect pigments suffer no mechanical damage during the mixing operation.

The particular advantage of this coating composition of the invention is that coats produced from it, i.e. fully cured coats, exhibit excellent elastomeric properties and yet these elastomeric properties have no adverse effect (e.g. impaired sanding properties) on the overall level of properties of the finished coat. This property is an important prerequisite wherever the finished coat is subject to stringent mechanical requirements.

This elastomeric property is of critical importance and is based on the rebound elasticity of the coat produced from the coating composition of the invention. By rebound elasticity is meant the property by which a mechanical impulse (e.g. stone chipping) is absorbed by means of an elastic deformation. This prevents injury to the material. The stresses which act from the outside on the paint system can comprise any kind of mechanical action, such as, for example, stone chipping in the case of vehicle finishes, frictional impact between painted components, or frictional impact by any articles on painted surfaces.

Furthermore, the composition B may additionally comprise a crosslinker, commercially customary additives and/or further binders.

In particular, it is advantageous for the polytetrahydrofuran segment of the two dispersions, identically or differently, to have a number-average molecular weight of between 1000 and 2900, in particular a number-average molecular weight of 2000.

In one preferred embodiment the polyurethanes used for the composition A and/or B are those whose hard segment is derived from a diisocyanate selected from aromatic diisocyanates such as 3,3'-dimethyl-4,4'-diphenylmethane diisocyanate (3,3'-dimethyl-4,4'-diisocyanatodiphenylmethane), 4,4'-methylenediphenyl diisocyanate (MDI, 4,4'-diisocyanatodiphenylmethane), 2,4-tolylene ciiisocyanate (TDI, 2,4-diisocyanato-toluene), toluidine 4,4'-diisocyanate (TODI, 3,3'-dimethyl-4,4'-diisocyanatobenzidine), 1,5-naphthylene diisocyanate (NDI, 1,5-diisocyanatonaphthalene, 1,3-bis(3-isocyanato-4-methylphenyl)-2,4-dioxo-1,3-diazetidine (Desmodur TT), and 1,3-bis(1-isocyanato-1-methylethyl)benzene (TMXDI, m-tetramethylxylylene diisocyanate); and especially from aliphatic diisocyanates such as 1,1-methylenebis(4-isocyanatocyclohexane) (4,4'-dicyclohexylmethane diisocyanate, Desmodur W), hexamethylene diisocyanate (HMDI, 1,6-diisocyanatohexane, Desmodur H), isophorone diisocyanate (IPDI, 3,5,5-trimethyl-1-isocyanato-3-isocyanatomethylcyclohexane), and 1,4-cyclohexyl diisocyanate (CHDI, trans,trans-1,4-diisocyanatocyclohexane).

In accordance with one particular embodiment of the invention a portion of the hard segments derived from a diisocyanate is replaced by from 0.1 to 2% by weight—based on the isocyanate component of the polyurethane—of segments derived from a triisocyanate, the triisocyanate being selected from aromatic triisocyanates such as tris(4-iso-cyanatophenyl)methane (Desmoclur R), 1,3,5-tris(3-isocyanato-4-methylphenyl)-2,4,6-trioxohexahydro-1,3,5-triazine (Desmodur IL); adducts of aromatic diisocyanates such as the adduct of 2,4-tolylene ciisocyanate (TDI, 2,4-diisocyanatotoluene) and trimethylolpropane (Desmodur L); and especially from aliphatic triisocyanates such as N-isocyanatohexylaminocarbonyl-N,N'-bis(isocyanatohexyl)urea (Desmodur N), 2,4,6-trioxo-1,3,5-tris(6-isocyanatohexyl)hexahydro-1,3,5-triazine (Desmodur N3390), and 2,4,6-trioxo-1,3,5-tris(5-isocyanato-1,3,3-trimethylcyclo-hexylmethyl)hexahydro-1,3,5-triazine (Desmodur Z4370).

In one preferred embodiment the proportion of polyurethane, based on the solids of the coating composition overall, is between 10 and 85%, preferably between 20 and 65% and, in particular, between 30 and 60%.

The term "solids" embraces all non-volatile constituents of the coating composition, i.e. binders, pigments and any fillers, additives, etc.

The ratio of composition A to the composition B in the finished coating composition can—based on its solids—be between 1:5 and 8:1, preferably between 1:4 and 4:1 and, in particular, between 1:2 and 2:1.

It is advantageous for the number-average molecular weight of the polyurethane of the respective dispersion, identically or differently, to be between 4000 and 50,000, preferably between 6000 and 25,000.

The proportion of polytetrahydrofuran segments in the polyurethane of the respective dispersion, identically or differently, based on the solids of the corresponding polyurethane, is preferably between 30 and 80%, in particular between 45 and 70%.

In one particularly preferred embodiment of the present invention the polyurethane of the respective dispersion, identically or differently, additionally comprises a short-chain polyol segment having from 2 to 12 carbon atoms.

This short-chain polyol segment can in particular be selected from 1,6-hexanediol, neopentyl glycol, dimethylolcyclohexane, trimethylolpropane monoallyl ether, neopentyl glycol hydroxypivalate, ethylene glycol, propylene glycol and trimethylolpropane.

The proportion of the cliisocyanate segment in the polyurethane of the respective dispersion can independently of one another, based on the solids of the polyurethane, be between 5 and 40%, preferably between 10 and 20%.

The polyurethane described in all embodiments of the present invention can be employed as such, i.e. as the prepolymer, or else can be extended by means of appropriate measures. One possibility, for example, is to increase the molecular weight by means of chain extenders. Chain extenders which can be employed are any desired diamines or polyamines.

Such diamines and polyamines are, for example, those having primary and/or secondary amino groups. Polyamines are primarily alkylene polyamines having 1 to 40 carbon atoms, preferably having about 2 to 15 carbon atoms. They can carry substituents which have no hydrogen atoms that are reactive with isocyanate groups. Examples are polyamines having a linear or branched aliphatic, cycloaliphatic or aromatic structure and at least two primary amino groups. Suitable diamines are hydrazine, ethylenediamine, propylenediamine, 1,4-butylenediamine, piperazine, 1,4-cyclohexyldimethylamine, hexamethylene-1,6-diamine, trimethylhexamethylenediamine, isophoronediamine, 1-amino-3-aminomethyl-3,5,5-trimethylcyclohexane, 4,4'-diaminodicyclohexylmethane and aminoethylethanolamine.

Diamines or polyamines which are used in particular are 2-methylcdiaminopentane, ethylenediamine, N,N-diethylenetriamine, adipic bishydrazide and hydrazine. Accordingly, the polyurethane can have at least one diamine or polyamine segment originating from the chain extender, especially a 2-methyldiaminopentane, ethylenediamine, N,N-diethylenetriamine, adipic bishydrazide or hydrazine segment.

Alternatively, it is also possible for the polyurethane in the composition A and/or B, independently of one another, to be replaced in part by a polyester resin or an aqueous polyester dispersion.

Polyester resins which can be used are those as described in M. J. Husbands et al. "A Manual of Resins for Surface Coatings", (1987) SITA Technology, London, volume 3, pp. 129 to 141.

By an aqueous polyester dispersion is meant any desired dispersion of crosslinked or non-crosslinked polyester particles, especially dispersions of polyester microparticles (polyester dispersion crosslinked with a melamine resin), as are described, for example, in DE-A-39 40 316.

This is particularly advantageous when it is desired to achieve a pronounced metallic effect with the coating composition of the invention.

In accordance with one particular embodiment of the present invention it can be advantageous to crosslink the coating composition of the invention by means of appropriate crosslinking agents. The crosslinking agent used is preferably at least one crosslinker selected from blokked isocyanates, melamine resins and, in particular, TACT.

Accordingly, the coat obtained from the coating composition of the invention can comprise segments which originate from blocked isocyanates, melamine resins and, in particular, TACT.

As crosslinking agents it is possible to use those blocked polyisocyanates in which the isocyanate groups have been reacted with a compound so that the blocked polyisocyanate formed is resistant to hydroxyl groups at room temperatures but reacts at elevated temperatures, generally within the range from about 90 to 300° C. In preparing the blocked polyisocyanates it is possible to use any desired organic polyisocyanates which are suitable for crosslinking. Preference is given to the isocyanates containing from about 3 to about 36 carbon atoms, in particular from about 8 to 15 carbon atoms. Examples of suitable diisocyanates are the abovementioned diisocyanates. It is possible to use polyisocyanates of higher isocyanate functionality. Examples of these are tris(4-isocyanatophenyl)methane, 1,3,5-triisocyanatobenzene, 2,4,6-triisocyanatotoluene, 1,3,5-tris(6-isocyanatohexyl)biuret, bis(2,5-diisocyanato-4-methylphenyl)methane and polymeric polyisocyanates, such as dimers and trimers of diisocyanatotoluene. Furthermore, mixtures of polyisocyanates can also be used. The organic polyisocyanates suitable as crosslinking agents in the invention can also be prepolymers which are derived, for example, from a polyol, including a polyether polyol or a polyester polyol. For this purpose, as is known, polyols are reacted with an excess of polyisocyanates to give prepolymers having terminal isocyanate groups. Examples of polyols which can be used for this purpose are simple polyols, such as glycols, e.g. ethylene glycol and propylene glycol, and other polyols, such as glycerol, trimethylolpropane, hexanetriol and pentaerythritol; and also monoethers, such as diethylene glycol and dipropylene glycol, and polyethers, which are adducts of such polyols and alkylene oxides. Examples of alkylene oxides suitable for polyaddition with these polyols to form polyethers are ethylene oxide, propylene oxide, butylene oxide and styrene oxide. These polyaddition products are generally referred to as polyethers having terminal hydroxyl groups. They can be linear or branched. Examples of such polyethers are polyoxyethylene glycol having a molecular weight of 1540, polyoxypropylene glycol having a molecular weight of 1025, polyoxytetramethylene glycol, polyoxyhexamethylene glycol, polyoxynonamethylene glycol, polyoxydecamethylene glycol, polyoxydodecamethylene glycol and mixtures thereof. Other types of polyoxyalkylene glycol ethers can likewise be used. Particularly suitable polyether polyols are those obtained by reacting such polyols, such as ethylene glycol, diethylene glycol, triethylene glycol, 1,4-butanediol, 1,3-butanediol, 1,6-hexanediol and mixtures thereof; glycerol, trimethylolethane, trimethylolpropane, 1,2,6-hexanetriol, dipentaerythritol, tripentaerythritol, polypentaerythritol, methylglucosides and sucrose, with alkylene oxides such as ethylene oxide, propylene oxide or mixtures thereof. For blocking the polyisocyanates it is possible to use any desired suitable aliphatic, cycloaliphatic or aromatic alkyl monoalcohols. Examples thereof are aliphatic alcohols, such as methyl, ethyl, chloroethyl, propyl, butyl, amyl, hexyl, heptyl, octyl, nonyl, 3,3,5-trimethylhexyl, decyl and lauryl alcohol; aromatic alkyl alcohols, such as phenylcarbinol and methylphenylcarbinol. If desired, it is also possible to use small proportions of monoalcohols of higher molecular mass and relatively low volatility, in which case these alcohols, following their elimination, act as plasticizers in the coatings.

Other suitable blocking agents are oximes, such as methyl ethyl ketone oxime, acetone oxime and cyclohexanone oxime, and also caprolactams, phenols and hydroxamic esters. Preferred blocking agents are malonic esters, acetoacetic esters and β-diketones. The blocked polyisocyanates are prepared by reacting the blocking agent in a sufficient amount with the organic polyisocyanate so that free isocyanate groups are no longer present.

As crosslinking agents it is possible to use those melamine resins as are described in "Lackharze", D. Stoye, W. Freitag, Hanser Verlag, Munich (1996), pp. 104 to 126. TACT comprises tris(alkoxycarbonylamino)-1,3,5-triazines. Preference is given to the use of tris(methoxycarbonylamino)-1,3,5-triazine, tris(butoxycarbonylamino)-1,3,5-triazine or a mixture thereof. Compounds of this kind are produced and marketed by the company Cytec.

In addition to the components described, the coating composition of the invention may include customary coatings auxiliaries, such as catalysts, levelling agents and light stabilizers, for example.

For a detailed preparation of polyurethanes, their starting materials, and the techniques and methods of their modification, such as chain extension and crosslinking, for example, reference is made to the literature D. Dieterich "Aqueous Emulsions, Dispersions and Solutions of Polyurethanes; Synthesis and Properties" in Progress in Organic Coatings, 9 (1981), pp. 281 to 340; "Ullmann's Encyclopedia of Industrial Chemistry", 5 th ed., volume 21, pp. 665 to 716, and M. J. Husbands et al. "A Manual of Resins for Surface Coatings" (1987), SITA Technology, London, volume 3, pp. 1 to 59.

In accordance with one particularly preferred embodiment, the coating composition of the invention is used for producing a coating for an electrically conductive substrate or for a plastics surface.

The term "electrically conductive substrate" refers both to untreated metal and to metal which has been pretreated (for example phosphatized) against corrosion. The term also embraces plastics surfaces which by appropriate measures have been coated with an electrically conducting layer.

This coating can be a multicoat paint system, especially a multicoat paint system for the automotive industry.

The multicoat paint system can consist of three different coats, i.e.

a) a first coat, situated on the electrically conductive substrate and comprising an electrophoretically deposited coating material;

b) a second, colouring coat comprising the coating composition of the invention; and c) a third coat comprising a clearcoat.

The particular feature of this embodiment of the invention (three-coat paint system) is that the cured coat originating from the coating composition of the invention, under predetermined mechanical stress, is not detached, or is detached only from the first coat comprising the electrodeposition coating.

Alternatively, the multicoat paint system can consist of four different coats, i.e.

a) a first coat, situated on the electrically conductive substrate and comprising an electrophoretically deposited coating material;

b) a second coat comprising a primer or the surfacer;

c) a third, colour-imparting coat comprising the coating composition of the invention; and d) a fourth coat comprising a clearcoat.

One advantage when using the coating composition in this four-coat structure is that the cured, third coat originating from the coating composition of the invention has a further positive influence on the stone-chip protection properties of the second, surfacer coat.

Through the use of this special coating composition in the three-coat structure it is possible to achieve a coat thickness which is much higher than that of conventional basecoats. The thickness of the cured coat produced from the coating composition of the invention can be between 15 and 55 $\mu$m.

The coating materials to be deposited electrophoretically are aqueous coating compositions having a solids content of from about 10 to 20% by weight which commonly carry binders, ionic substituents or substituents which can be converted into ionic groups, and groups capable of chemical crosslinking, and also pigments and further customary additives. Examples of such electrodeposition coating materials are described in DE-A-28 24 418, DE-A-33 24 211, EP-A-082 291, EP-A-178 531, EP-A-227 975, EP-A-234 395, EP-A-245 786, EP-A-261 385, EP-A-310 971, EP-A-333 327, EP-A-414 199, EP-A-456 270, EP-A-476 514 and U.S. Pat. No. 3,922,253.

The clearcoat which is disposed over the coat obtained from the coating composition of the invention can be obtained by applying and stoving a conventional, solventborne or aqueous clearcoat composition, which is a one- or two-component mixture and comprises one or more base resins as film-forming binders. Where the binders are not self-crosslinking, the clearcoat composition can, if desired, also include crosslinkers. Examples of film-forming binders (base resins) which can be used are polyester, polyurethane and/or poly(meth)acrylate resins.

In addition to the chemically crosslinking binders and, if desired, crosslinkers, these clearcoats may include customary coating auxiliaries, such as catalysts, levelling agents and light stabilizers, for example.

Examples of solventborne clearcoat compositions in one- or two-component mixtures are described in DE-A-38 26 693, DE-A-40 17 075, DE-A-41 24 167, DE-A-41 33 704, DE-A-42 04 518, DE-A-42 04 611, EP-A-257 513, EP-A-408 858, EP-A-523 267 and EP-A-557 822.

Examples of aqueous clearcoat compositions as one- or two-component mixtures are described in DE-A-39 10 829, DE-A-40 09 931, DE-A-40 09 932, DE-A-41 01 696, DE-A-41 32 430, DE-A-41 34 290, DE-A-42 03 510, EP-A-365 098, EP-A-365 775, EP-A-469 079 and EP-A-546 640, especially in DE-A-44 19 216 and DE-A-44 42 518.

In one particularly preferred embodiment, the third coat is produced from a transparent powder coating material or from a transparent powder coating slurry. In respect of the transparent powder coating material or slurry, reference is made to DE-A-42 22 194, DE-A-42 27 580, EP-A-509 392, EP-A-509 393, EP-A-522 648, EP-A-544 206, EP-A-555 705, EP-A-652 265, EP-A-666 779, and to EP-A-714 958.

As tests for checking the stone-chip protection in the case of automotive finishes there are various methods which, although having been adapted to the specific field of use, are all aimed at reproducing the mechanical action as closely as possible. For example, there are tests laid down in the automotive industry which attempt to simulate stone chipping by the impact of a ball (Mercedes-Benz AG, paint testing apparatus with ball impact tester at temperatures of from −20 to +50° C., a ball diameter of optionally from 2 to 4 mm and a shot speed of from 50 to 300 km/h) or of a chisel-like test element (test VDA 621–428 of BMW AG) on the finished surface at precisely defined temperatures (room temperature and −20° C.) and under other precisely defined parameters.

EXAMPLES

The examples which follow serve to illustrate the invention without limiting it.

1. Preparation of Polyesters 1.1 Polyester 1

In a 4 l reaction vessel with stirrer and water separator, 2912.0 parts of polytetrahydrofuran having an average molecular weight of 2000 (Terathane® 2000 from DuPont) and 106.3 parts of adipic acid are esterified to an acid number of <4. This gives a polyester having an average molecular weight of 3940.

1.2 Polyester 2

In a 4 l reaction vessel with stirrer and packed column, 805.4 parts of 1,6-hexanediol, 709.8 parts of neopentyl glycol and 1616.2 parts of phthalic anhydride are esterified to an acid number of <4. This gives a polyester having an average molecular weight of 1020.

1.3 Polyester 3

In a 4 l reaction vessel with stirrer and packed column, 650 parts of 1,6-hexanediol and 2313 parts of Pripol® 1013 (dimer fatty acid from Unichema) are esterified to an acid number of <4. This gives a polyester having an average molecular weight of 2013.

2. Preparation of Water-dilutable Polyurethane Resins 2.1 Polyurethane Resin Dispersion 1

In a 10 l reaction vessel with stirrer and reflux condenser, a mixture of 1512.0 parts of polytetrahydrofuran having an average molecular weight of 1000 (Terathane® 1000 from DuPont), 128.7 parts of dimethylolpropionic acid, 523.6 parts of tetramethylxylylene diisocyanate, 240.5 parts of N-methylpyrrolidone and 1.5 parts of dibutyltin dilaurate is heated at a reaction temperature of 100° C. until the NCO content has fallen to about zero %. The mixture is diluted further with 481.0 parts of butyl glycol. Then a mixture of 68.4 parts of N,N-dimethylethanolamine and 1300.0 parts of deionized water is added and the solids content is adjusted to 35% using 1929.7 parts of deionized water. This gives a polyurethane dispersion having a pH of 7.50. The polymer has an acid number of 25.

2.2 Polyurethane Resin Dispersion 2

In a 10 l reaction vessel with stirrer and reflux condenser, a mixture of 2101.3 parts of polyester 1, 148.4 parts of dimethylolpropionic acid, 300.3 parts of tetramethylxylylene diisocyanate, 283.3 parts of N-methylpyrrolidone and 1.0 part of dibutyltin dilaurate is heated at a reaction temperature of 100° C. until the NCO content has fallen to about zero %. The mixture is diluted further with 566.7 parts of butyl glycol. Then a mixture of 78.8 parts of N,N-dimethylethanolamine and 1498.1 parts of deionized water is added and the solids content is adjusted to 34% using 2523.0 parts of deionized water. This gives a polyurethane dispersion having a pH of 7.41. The polymer has an acid number of 25.

2.3 Polyurethane Resin Dispersion 3

In a 10 l reaction vessel with stirrer and reflux condenser, a mixture of 1563.3 parts of polytetrahydrofuran having an average molecular weight of 650 (Terathane® 650 from DuPont), 148.7 parts of dimethylolpropionic acid, 767.4 parts of tetramethylxylylene diisocyanate, 275.5 parts of N-methylpyrrolidone and 2.5 parts of dibutyltin dilaurate is heated at a reaction temperature of 100° C. until the NCO content has fallen to about zero %. The mixture is diluted further with 551.0 parts of butyl glycol. Then a mixture of 79 parts of N,N-dimethylethanolamine and 1497.9 parts of deionized water is added and the solids content is adjusted to 35% using 2201.0 parts of deionized water. This gives a polyurethane dispersion having a pH of 7.46. The polymer has an acid number of 25.

2.4 Polyurethane Dispersion 4 (Without PTHF)

The procedure is as for the preparation of polyurethane dispersion 1. Instead of 1512.0 parts of polytetrahydrofuran 1000, however, 1542.0 parts of polyester 2 are used. This gives a polyurethane dispersion having a solids content of 35% and a pH of 7.20. The polymer has an acid number of 25.

2.5 Polyurethane Resin Dispersion 5

In a 6 l reaction vessel with stirrer and reflux condenser, a mixture of 840.0 parts of polytetrahydrofuran having an average molecular weight of 2000 (Terathane® 2000 from DuPont), 116.5 parts of 1,6-hexanediol, 50.7 parts of dimethylolpropionic acid, 486.8 parts of tetramethylxylylene diisocyanate, 630.0 parts of methyl ethyl ketone and 1.5 parts of clibutyltin dilaurate is heated at a reaction temperature of 80° C. until the NCO content is 0.67%. Then a mixture of 14.5 parts of 2-methylpentamethylenediamine and 326.0 parts of water is added. Subsequently, a mixture of 33.6 parts of N,N-dimethylethanolamine and 2848.8 parts of deionized water is added and the methyl ethyl ketone is removed completely by distillation under vacuum. This gives a polyurethane dispersion having a solids content of 33% and a pH of 8.80. The polymer has an acid number of 14.

2.6 Polyurethane Resin Dispersion 6

In a 6 l reaction vessel with stirrer and reflux condenser, a mixture of 661.9 parts of polyester 1, 88.7 parts of 1,6-hexanediol, 38.6 parts of dimethylolpropionic acid, 333.8 parts of tetramethylxylylene diisocyanate, 481.3 parts of methyl ethyl ketone and 1.5 parts of dibutyltin dilaurate is heated at a reaction temperature of 80° C. until the NCO content is 0.63%. Then a mixture of 10.5 parts of 2-methylpentamethylenediamine and 232.9 parts of water is added. Subsequently, a mixture of 25.6 parts of N,N-dimethylethanolamine and 2150.2 parts of deionized water is added and the methyl ethyl ketone is removed completely by distillation under vacuum. This gives a polyurethane dispersion having a solids content of 32% and a pH of 8.60. The polymer has an acid number of 14.

2.7 Polyurethane Resin Dispersion 7

In a 6 l reaction vessel with stirrer and reflux condenser, a mixture of 471.2 parts of polytetrahydrofuran having an average molecular weight of 650 (Terathane® 650 from DuPont), 80.4 parts of 1,6-hexanediol, 35.0 parts of dimethylolpropionic acid, 442.2 parts of tetramethylxylylene diisocyanate, 440.9 parts of methyl ethyl ketone and 1.5 parts of dibutyltin dilaurate is heated at a reaction temperature of 80° C. until the NCO content is 0.69%. Then a mixture of 10.5 parts of 2-methylpentamethylenediamine and 233.6 parts of water is added. Subsequently, a mixture of 23.2 parts of N,N-dimethylethanolamine and 1853.1 parts of deionized water is added and the methyl ethyl ketone is removed completely by distillation under vacuum. This gives a polyurethane dispersion having a solids content of 33% and a pH of 8.66. The polymer has an acid number of 14.

2.8 Polyurethane Dispersion 8 (Without PTHF)

The procedure is as for the preparation of polyurethane dispersion 5. Instead of 840.0 parts of polytetrahydrofuran 2000, however, 845 parts of polyester 3 are used. This gives a polyurethane dispersion having a solids content of 33% and a pH of 8.86. The polymer has an acid number of 14.

3. Preparation of Basecoats

The polyurethane dispersions described were used to prepare white straight-shade basecoats and also a metallic basecoat, which were tested for their suitability for use for a 3-coat structure without surfacers.

Table I below lists the compositions of the individual aqueous basecoats. In this table, Examples 1 to 5 are straight-shade aqueous basecoats and Example 6 is a metallic aqueous basecoat.

Examples 1 to 3 and 6 are embodiments of the invention; Examples 4 and 5 are comparative examples.

TABLE I

| Component/Example | Ex. 1 | Ex. 2 | Ex. 3 | Ex. 4 (comp.) | Ex. 5 (comp.) | Ex. 6 |
|---|---|---|---|---|---|---|
| Pu dispersion 1 | 116.1 | | | | 341.2 | 190.4 |
| PU dispersion 2 | | 119.4 | | | | |
| PU dispersion 3 | | | 116.1 | | | |
| PU dispersion 4 | | | | 116.1 | | |
| Dimethyl-ethanolamine | 2 | 2 | 2 | 2 | 4.3 | 3.3 |
| Deionized water | 35 | 30 | 35 | 35 | | 255 |
| Surfinol 104E* | 5.8 | 5.8 | 5.8 | 5.8 | 5.8 | |
| TiO₂ Kronos 2057 | 351.4 | 351.4 | 351.4 | 351.4 | 351.4 | 8.3 |
| | | | | | | 14.5 |
| grind to a particle fineness <5 μm, then make up with | | | | | | |
| PU dispersion 5 | 238.7 | | | | | 423.2 |
| PU dispersion 6 | | 246.2 | | | | |
| PU dispersion 7 | | | 238.7 | | | |
| PU dispersion 8 | | | | 238.7 | | |
| Luwipal 072** | 28.5 | 28.5 | 28.5 | 28.5 | 28.5 | 85.6 |
| Butyl glycol | 39.6 | 39.6 | 39.6 | 39.6 | 39.6 | |

TABLE I-continued

| Component/Example | Ex. 1 | Ex. 2 | Ex. 3 | Ex. 4 (comp.) | Ex. 5 (comp.) | Ex. 6 |
|---|---|---|---|---|---|---|
| Polyester microgel*** | 77.4 | 77.4 | 77.4 | 77.4 | 77.4 | 250.4 |
| Latekoll**** | | | | | | 19.2 |
| Dimethyl-ethanolamine | | | | | | 1.9 |
| Deionized water | | | | | | 323.2 |
| Commercial mica pigment | | | | | | 11.2 |
| Aluminium bronze | | | | | | 37.9 |
| Butyl glycol | | | | | | 69.4 |
| adjust with DMEA to a pH of from 8.8 to 9.0 | | | | | | |
| adjust viscosity with deionized water to 130 to 150 mPas (D = 1000 s⁻¹) | | | | | | |
| Solids content | 53% | 54% | 51% | 49% | 52% | |

*commercial defoamer
**melamine resin, 73% in butanol, commercial product from BASF AG, Ludwigshafen
***in dispersion, prepared in accordance with DE-A-39 40 316 (with 25% solids content)
****acrylate thickener (25% solids content), commercial product from BASF AG

Description of the Ball Impact Test

To conduct the ball impact test (in accordance with Mercedes-Benz) all basecoat materials were applied to phosphatizecd and CED-coated metal test panels 10 cm wide and 20 cm long (dry film thickness 25–30 μm). After 3 minutes of flashoff and 5 minutes of intermediate drying at 80° C., the metal panels were coated further with commercial 2-component clearcoat material (dry film thickness 35–40 μm). The panels were blasted at 250 km/h and −20° C., ball diameter 2 mm. Pass criteria: rusting max. 1, delamination area max. 8 mm².

Description of the Test for Boil Resistance

The basecoat material is applied by means of an automatic sprayer with compressed air atomization to a vertical perforated panel, with a coat thickness built up in the form of a wedge. After 3 minutes of flashoff, the metal panels are dried vertically at 80° C. for 5 minutes and then coated further with commercial 2-component clearcoat material (dry film thickness 35–40 μm). The result is reported as the basecoat thickness at which the first boil bubbles are formed.

Description of the Test for Run Resistance

The basecoat material is applied by means of an automatic sprayer with compressed air atomization to a vertical perforated panel, with a coat thickness built up in the form of a wedge. After 3 minutes of flashoff, the metal panels are dried vertically at 80° C. for 5 minutes and subsequently stoved at 130° C. for 10 minutes. The result is reported as the basecoat thickness at which the first runs are formed.

Table II below lists the results of the individual tests.

TABLE II

| Type of coating material | Example | Mercedes-Benz ball impact test Rusting | Delamination area | Run limit | Boil limit |
|---|---|---|---|---|---|
| Straight-shade aqueous | 1 | 0–1 | 4 mm² | 49 μm | 47 μm |
| | 2 | 0–1 | 2 mm² | 50 μm | 46 μm |
| | 3 | 2 | 8 mm² | 25 μm | 32 μm |

TABLE II-continued

| Type of coating material | Example | Mercedes-Benz ball impact test | | | Boil limit |
|---|---|---|---|---|---|
| | | Rusting | Delamination area | Run limit | |
| basecoat | 4 (comp.) | 5 | 8 mm² | 25 μm | 33 μm |
| | 5 (comp.) | 1 | 8 mm² | 26 μm | 28 μm |
| Metallic aqueous basecoat | 6 | 0-1 | 5 mm² | 28 μm | 32 μm |

What is claimed is:

1. Coating composition comprising a mixture of:
 a) composition A, comprising a dispersion of a polyurethane having an acid number of more than 20 and comprising as its soft segment at least one polytetrahydrofuran segment having a number-average molecular weight of between 650 and 5000 and as its hard segment at least one segment derived from a diisocyanate; with
 b) a composition B, comprising a dispersion of a polyurethane having an acid number of less than 20 and comprising as its soft segment at least one polytetrahydrofuran segment having a number-average molecular weight of between 800 and 5000 and as its hard segment at least one segment derived from a diisocyanate.

2. Coating composition according to claim 1, wherein composition A additionally comprises at least one colouring pigment.

3. Coating composition according to claim 1 wherein the composition B additionally comprises at least one of an effect pigment, a crosslinker, commercially customary additives and further binders.

4. Coating composition according to claim 1, wherein the polytetrahydrofuran segment has a number-average molecular weight of between 1000 and 2900.

5. Coating composition according to to claim 4, wherein the polytetrahydrofuran segment has a number-average molecular weight of 2000.

6. Coating composition according to claim 1, wherein the hard segment is derived from a diisocyanate selected from aromatic diisocyanates and from aliphatic diisocyanates.

7. Coating composition according to claim 6, wherein the diisocyanate is replaced by—based on the isocyanate component of the polyurethane—from 0.1 to 2% by weight of triisocyanates selected from aromatic triisocyanates; adducts of aromatic diisocyanates; and from aliphatic triisocyanates.

8. Coating composition according to claim 1, wherein the proportion of polyurethane in the coating composition overall, based on the solids content of the coating composition, is between 10 and 85% of the weight of the solids content.

9. Coating composition according to claim 1, wherein the ratio of composition A to the composition B based on the solids thereof is between 1:5 and 8:1.

10. Coating composition according to claim 1, wherein the number-average molecular weight of the polyurethane is between 4000 and 50,000.

11. Coating composition according to claim 1, wherein the proportion of polytetrahydrofuran segment in the polyurethane, based on the solids of the polyurethane, is between 30 and 80% by weight of the solids.

12. Coating composition according to claim 1, wherein the polyurethane additionally comprises a short-chain polyol segment having from 2 to 12 carbon atoms.

13. Coating composition according to claim 1, wherein the proportion of the segment derived from the diisocyanate in the polyurethane based on the solids of the polyurethane, is between 5 and 40% by weight of the solids.

14. Coating composition according to claim 1, wherein the polyurethane comprises as chain extender at least one diamine or polyamine segment.

15. Coating composition according to claim 1, wherein the polyurethane of the composition B is replaced in part by a polyester resin or an aqueous polyester dispersion.

16. Coating composition according to claim 1, wherein the coating composition additionally comprises at least one crosslinker selected from blocked isocyanates, melamine resins and tris (alkoxycarbonyl-amino)-1,3,5-triazine.

17. A coating composition according to claim 8, wherein the proportion of polyurethane in the coating composition overall is between 20 and 65%.

18. A coating composition according to claim 17, wherein the proportion of polyurethane in the coating composition overall is between 30 and 60%.

19. A coating composition according to claim 9, wherein the ratio of composition A to the composition B based on the solids thereof is between 1:4 and 4:1.

20. A coating composition according to claim 19, wherein the ratio of composition A to the composition B based on the solids thereof is between 1:2 and 2:1.

21. A coating composition according to claim 10, wherein the number-average molecular weight of the polyurethane is between 6,000 and 25,000.

22. A coating composition according to claim 11, wherein the proportion of polytetrahydrofuran segment in the polyurethane is between 45 and 70%.

23. A coating composition according to claim 12, wherein the short-chain polyol segment is selected from the group consisting of 1,6-hexanediol, neopentyl glycol, dimethylolcyclohexane, trimethylopropane monoallyle ether, neopentyl glycol hydroxypivalate, ethylene glycol, propylene glycol and trimethylolpropane.

24. A coating composition according to claim 14, wherein the chain extender is at least one of a 2-methyldiaminopentane, ethylenediamine, N,N-diethylenetriamine, adipic bishydrazide and hydrazine segment.

25. A process for producing a coating for an electrically conductive substrate or a plastic surface, comprising a step of mixing:
 a composition A comprising a dispersion of a polyurethane having an acid number of more than 20 and comprising as its soft segment at least one polytetrahydrofuran segment having a number-average molecular weight of between 650 and 5,000 and as its hard segment at least one segment derived from a diisocyanate; with
 a composition B comprising a dispersion of a polyurethane having an acid number of less than 20 and comprising as its soft segment at least one polytetrahydrofuran segment having a number-average molecular weight of between 800 and 5,000 and as its hard segment at least one segment derived from a diisocyanate.

26. A process according to claim 25, wherein the coating is a multicoat paint system.

27. A multicoat paint system comprising:
 a first coat situated on an electricall conductive substrate and comprising an electrophoretically disposed coating material;
 a second, color-imparting coat comprising a coating composition composed of a mixture of a composition A comprising a dispersion of a polyurethane having an acid number of more than 20 and comprising as its soft segment at least one polytetrahydrofuran segment having a number-average molecular weight of between 650 and 5,000 and as its hard segment at least one segment derived from a diisocyanate, with a composition B comprising a dispersion of a polyurethane having an acid number of less than 20 and comprising as its soft segment at least one polytetrahydrofuran segment having a number-average molecular weight of between 800 and 5,000 and as its hard segment at least one segment derived from a diisocyanate; and a third coat comprising a clear coat.

28. A multicoat paint system consisting of:

a first coat situated on an electrically conductive substrate and comprising an electrophoretically deposited coating material;

a second coat comprising one of a primer and surfacer;

a third, color imparting coat comprising a coating comprising a coating composition form from a mixture of a composition A comprising a dispersion of a polyurethane having an acid number of more than 20 and comprising as its soft segment at least one polytetrahydrofuran segment having a number-average molecular weight of between 650 and 5,000 and as its hard segment at least one segment derived from a diisocyanate, with a composition B comprising a dispersion of a polyurethane having an acid number of less than 20 and comprising as its soft segment at least one polytetrahydrofuran segment having a number-average molecular weight of between 800 and 5,000 and as its hard segment at least one segment derived from a diisocyanate; and a fourth coat comprising a clear coat.

29. A multicoat paint system according to claim 27, wherein the second coat has a thickness of 15 to 55 mm.

30. A multicoat paint system according to claim 28, wherein the second coat has a thickness of 15 to 55 mm.

31. A multicoat paint system according to claim 29, wherein the coat is produced from a transparent coating material comprising a transparent powder coating material or a transparent powder coating slurry.

32. A coating composition according to claim 6, wherein the aromatic diisocyanates are from the group consisting of 3,3'-dimethyl-4,4'-diphenylmethane diisocyanate (3,3'-dimethyl-4,4'-diisocyanatodiphenylmethane), 4,4'-methylenediphenyl diisocyanate (MDI, 4,4'-diisocyanatodiphenylmethane), 2,4-tolylene diisocyanate (TDI, 2-4-diisocyanato-toluene), toluidine 4,4'-diisocyanate (TODI, 3,3'-dimethyl-4,4'-diisocyanatobenzidine), 1,5-naphthylene diisocyanate (NDI. 1,5-diisocyanato-naphthalene, 1-3-bis(3-isocyanato-4-methylphenyl)-2,4-dioxo-1,3(Desmodur TT), and 1,3-bis(1-isocyanato-1-methylethylbenzene (TMXDI, m-tetramethylxylylene diisocyanate; and the aliphatic diisocyanates are from the group consisting of 1,1 -methylenebis(4-isocyanatocyclohexane) (4,4'-dicyclohexylmethane diisocyanate, Desmodur W), hexamethylene diisocyanate (HMDI, 1,6-diisocyanatohexane, Desmodur H), isophorone diisocyanate (IPDI, 3,5,5-trimethyl-1-isocyanato-3-isocyanatomethylcyclohexane), and 1,4-cyclohexyl diisocyanate (CHDI, trans,trans-1,4-diisocyanatocyclohexane).

33. A coating composition according to claim 7, wherein the aromatic triisocyanates are selected from the group consisting of tris(4-isocyanatophenyl)methane (Desmodur R), 1,3,5-tris(3-isocyanato-4-methylphenyl)-2,4,6-trioxohexahydro-1,3,5-triazine (Desmodur IL); the adducts of aromatic diisocyanates are the adduct of 2,4-tolylene diisocyanate (TDI, 2,4-diisocyanatotoluene) and trimethylolpropane (Desmodur L); and the aliphatic triisocyanates are selected from the group consisting of N-isocyanatohexyl-aminocarbonyl N,N'-bis (isocyanatohexyl)urea (Desmodur N), 2,4,6-trioxo-1,3,5-tris (6-isocyanato-hexyl)hexa-hydro-1,3,5-triazine (Desmodur N3390), and 2,4,6-tirioxo-1,3,5-tris(5-isocyanato-1,3,3-trimethylcyclohexylmethyl)hexahydro-1,3,5-triazine (Desmodur N4370).

\* \* \* \* \*